United States Patent
Lindahl

(10) Patent No.: US 10,764,670 B2
(45) Date of Patent: Sep. 1, 2020

(54) SYSTEM HAVING DEVICE-MOUNT AUDIO MODE

(71) Applicant: Apple Inc., Cupertino, CA (US)

(72) Inventor: Aram M. Lindahl, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/395,714

(22) Filed: Apr. 26, 2019

(65) Prior Publication Data

US 2019/0349662 A1 Nov. 14, 2019

Related U.S. Application Data

(60) Provisional application No. 62/669,322, filed on May 9, 2018.

(51) Int. Cl.

| H04R 1/10 | (2006.01) |
|---|---|
| G10L 19/00 | (2013.01) |
| H04R 1/40 | (2006.01) |
| H04R 3/00 | (2006.01) |
| H04R 3/12 | (2006.01) |
| G06F 3/01 | (2006.01) |

(52) U.S. Cl.
CPC .......... *H04R 1/1041* (2013.01); *G06F 3/011* (2013.01); *G10L 19/00* (2013.01); *H04R 1/1016* (2013.01); *H04R 1/403* (2013.01); *H04R 1/406* (2013.01); *H04R 3/005* (2013.01); *H04R 3/12* (2013.01); *H04R 2420/07* (2013.01)

(58) Field of Classification Search
USPC .... 381/26, 74, 300, 311, 361, 370, 376, 386
See application file for complete search history.

(56) References Cited

U.S. PATENT DOCUMENTS

| 9,513,702 | B2 | 12/2016 | Cho |
| 2015/0346492 | A1 | 12/2015 | Kim |
| 2017/0123744 | A1 | 5/2017 | Park et al. |
| 2017/0315612 | A1* | 11/2017 | Shanware ............... G06F 3/013 |
| 2019/0286283 | A1* | 9/2019 | Parkinson ............ G06F 1/1694 |

* cited by examiner

*Primary Examiner* — Yosef K Laekemariam
(74) *Attorney, Agent, or Firm* — Womble Bond Dickinson (US) LLP

(57) ABSTRACT

A system having a head-mounted display (HMD) mount and a mobile device, are described. A processor of the system can determine whether the mobile device is mounted on the HMD mount and handle an audio signal communicated from the mobile device to a wireless headphone based on whether the mobile device is mounted on the HMD mount. When the mobile device is not mounted on the HMD mount, the mobile device or the wireless headphone may operate in a first audio mode. When the mobile device is mounted on the HMD mount, the mobile device or the wireless headphone may operate in a second audio mode. The second audio mode can reduce audio signal latency between the mobile device and the wireless headphone and increase motion-to-sound quality. Other embodiments are also described and claimed.

20 Claims, 6 Drawing Sheets

SYSTEM HAVING DEVICE-MOUNT AUDIO MODE

This application claims the benefit of priority of U.S. Provisional Patent Application No. 62/669,322, filed on May 9, 2018, which is incorporated herein by reference in its entirety to provide continuity of disclosure.

BACKGROUND

Field

Embodiments related to head-mounted displays, are disclosed. More particularly, embodiments related to head-mounted display systems having audio outputs, are disclosed.

Background Information

Head-mounted displays (HMDs) are display devices that can be worn on a head to display images to a user. HMDs are used for gaming, aviation, etc. HMDs include virtual reality and augmented reality headsets, which are head-mounted devices that provide realistically simulated experiences for the user. Some virtual reality headsets include an HMD mount to hold a mobile device, such as a smartphone, in front of the user. The mobile device displays images of a virtual reality scene and may play sounds corresponding to the displayed images. The HMD mount can include electronics, such as a processor or an inertial measurement unit, and the mobile device may communicate electrical signals with the HMD mount through electrical cables and connectors. For example, the user may manually control the mobile device by interacting with the HMD mount to input control signals that are communicated through the electrical cables and connectors to the mobile device.

SUMMARY

A system including a head-mounted display (HMD) mount and a mobile device, and methods of activating audio modes of the system based on a physical relationship between the HMD mount and the mobile device, are disclosed. In an embodiment, the HMD mount and the mobile device are joined by mounting the mobile device on the HMD mount. The system can detect whether the mobile device is mounted on the HMD mount and make changes to an audio mode in response to the detection. For example, a device processor can determine that the mobile device is mounted in an enclosure of the HMD mount and responsively change an audio mode of the mobile device from a first (e.g., a normal) audio mode to a second (e.g., a special) audio mode. Alternatively, the device processor can responsively transmit an audio mode signal to a wireless headphone processor of a wireless headphone indicating that the mobile device and HMD mount are physically paired (adjacent or fixed to one another). The wireless headphone (or one or more speakers built into the HMD mount) can, in response to receiving the audio mode signal, determine that the mobile device is mounted and change an audio mode from a first audio mode to a second audio mode. The audio mode change of the mobile device or the wireless headphone can include reducing an audio signal latency of a latency chain between the mobile device and the wireless headphone. For example, the audio signal latency may be reduced by reducing a buffer size used to store the audio signal in a wireless headphone memory of the wireless headphone. The mobile device may change the audio mode by using a different digital audio codec in the second audio mode to reduce the audio signal latency. Accordingly, the second audio mode may have a lower audio signal latency than the first audio mode. The lower audio signal latency can provide a desired motion-to-sound latency between movement of an object displayed in a virtual reality scene by the mobile device and a corresponding sound played by the wireless headphone (or by one or more speakers built into the HMD mount).

In an embodiment, the change to the audio mode can involve non-latency adjustments to the mobile device or the wireless headphone. For example, the wireless headphone (or the HMD mount) can include speakers to play a sound corresponding to an image displayed by the mobile device, and the sound may be rendered in a different direction in the second audio mode than in the first audio mode. Alternatively or additionally, the mobile device can include microphones to pick up sound from a surrounding environment, and the microphones may be adjusted to pick up sound in a preset direction, e.g., corresponding to a presumed direction of a user's mouth, when the system operates in the second audio mode.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
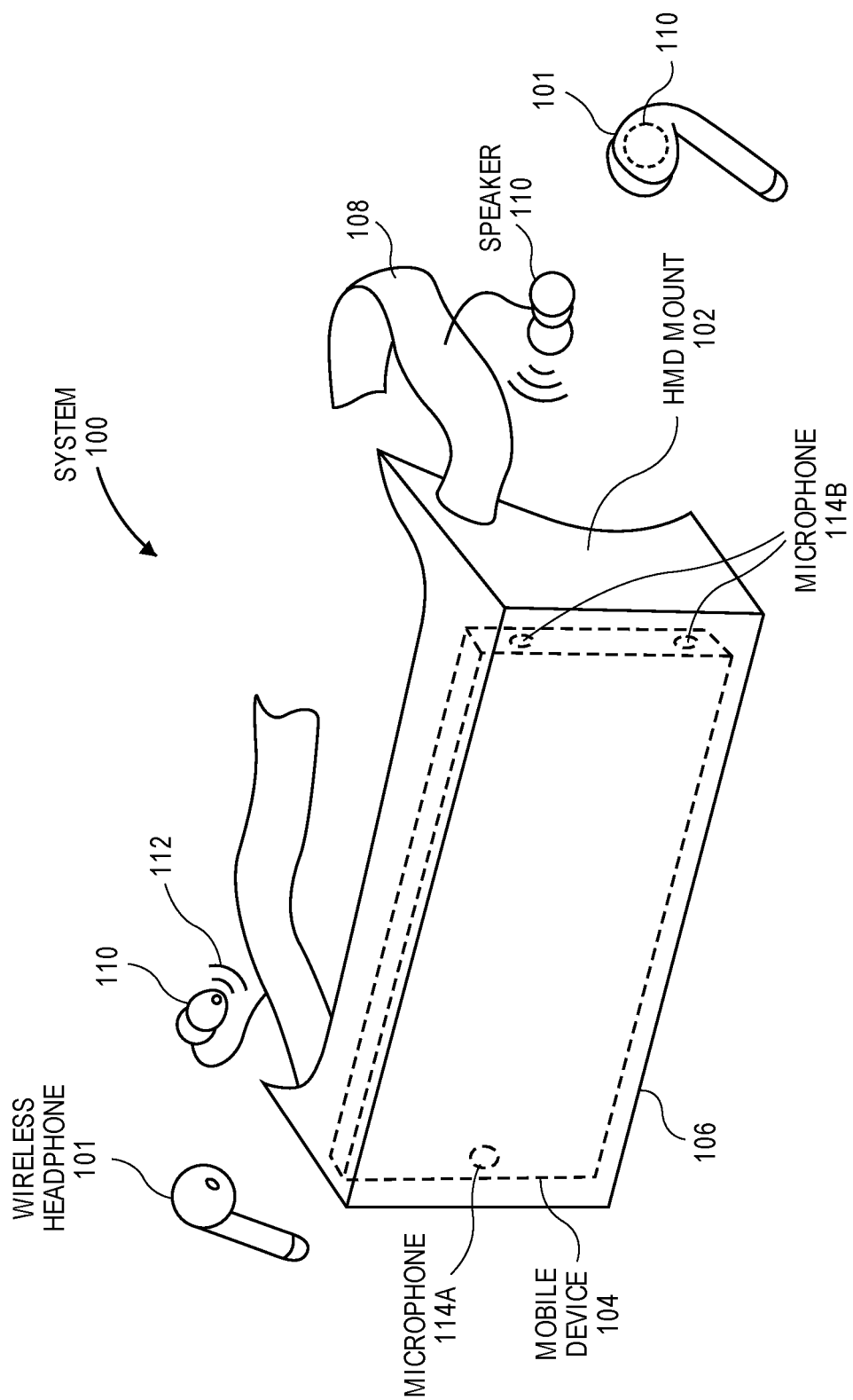
FIG. 1 is a pictorial view of a system having a mobile device mounted on a head-mounted display (HMD) mount, in accordance with an embodiment.

Embodiments describe a system having controllable audio modes and including a head-mounted display (HMD), and methods of activating the audio modes based on a physical relationship between the HMD mount and a mobile device. The system may be used as a virtual reality or augmented reality headset. The system may, however, be used for other applications, such as for aviation, engineering, or medicine, to name only a few possible applications.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "in front of" may indicate a first direction away from a reference point. Similarly, "behind" may indicate a location in a second direction away from the reference point and opposite to the first direction. Such terms are provided to establish relative frames of reference, however, and are not intended to limit the use or orientation of a system to a specific configuration described in the various embodiments below.

In an aspect, a system is capable of automatically changing audio modes based on a physical relationship between an HMD mount and a mobile device. A processor of the system, e.g., a device processor of the mobile device and/or a wireless headphone processor of a wireless headphone of the HMD mount, can recognize that the mobile device is mounted on the HMD mount. The mobile device and/or the wireless headphone can responsively change from a first audio mode to a second audio mode. The second audio mode can include one or more changes to how an audio signal generated by the mobile device is processed, and can reduce a latency of the audio signal. When the system operates in the second audio mode, sound rendered to a user by the wireless headphone can realistically track with an image displayed to the user by the mobile device. Accordingly, the mobile device and/or the wireless headphone having a device-mount audio mode can present a realistic augmented reality or virtual reality experience to the user.

Referring to FIG. 1, a pictorial view of a system having a mobile device mounted on a head-mounted display (HMD) mount is shown in accordance with an embodiment. A system 100 can include an HMD mount 102 and a mobile device 104 (shown hidden within HMD mount 102). HMD mount 102 and mobile device 104 may be separable. For example, mobile device 104 may be mounted on, and dismounted from, HMD mount 102. In an embodiment, HMD mount 102 includes an enclosure 106 that is held on a head of a user by a strap 108, a temple, an arm, or another feature extending from the enclosure 106 to engage with the head of the user. Mobile device 104 can be mounted in enclosure 106 of HMD mount 102. Mobile device 104 can be a smartphone, a tablet computer, etc.

System 100 can include various electronics and audio hardware to generate sound 112 associated with images displayed by mobile device 104. More particularly, system 100 may include speakers 110, which can include electroacoustic transducers to convert an audio signal transmitted by mobile device 104 into sound 112.

In an embodiment, the audio hardware having speakers 110 is a wireless headphone 101 in signal communication with mobile device 104. Wireless headphone 101 may include several headphones, e.g., a left headphone and a right headphone, that are external to HMD mount 102.

In an embodiment, the audio hardware having speakers 110 is built into HMD mount 102. HMD mount 102 can include a mounting body and a headphone component having one or more speakers 110 to generate sound 112 for the user. The headphone component can be physically connected to the mounting body by electrical cables. Accordingly, speakers 110 of system 100, whether headphones or earbuds that are external to or built into HMD mount 102 can render sound 112 associated with images displayed by the mobile device 104 when mobile device 104 is mounted on HMD mount 102.

Sound 112 creates various audio experiences for the user. Playback of the audio signal by speakers 110 can render sound 112 in a standard stereo experience with a center sound image inside of the head of the user. The center sound image may correspond to an ambient noise associated with a virtual reality scene displayed by mobile device 104. Playback of the audio signal by speakers 110 can render sound 112 in a spatialized audio experience with a virtual sound image rendered in a direction of a virtual sound source. The virtual sound image may correspond to a voice associated with the virtual sound source, e.g., a person, displayed within the virtual reality scene by the mobile device 104. The audio signal may be processed at mobile device 104 or at a processor contained in a housing of wireless headphone 101 or HMD mount 102 to produce the intended audio experience(s).

Mobile device 104 can include various electronics and audio hardware. In an embodiment, mobile device 104 includes one or more microphones 114. Microphones 114 may be located at several locations on mobile device 104 to receive sound entering mobile device 104 from various directions. For example, a first microphone 114A may be mounted on a rear surface of mobile device 104 to receive sound from a rear direction when mobile device 104 is being used in a hand-held configuration. Mobile device 104 can include one or more second microphones 114B mounted on a bottom surface of mobile device 104 to receive sound from a bottom direction when mobile device 104 is being used in the hand-held configuration. First microphone 114A may be occluded by enclosure 106 when mobile device 104 is mounted in HMD mount 102. By contrast, second microphones 114B may not be occluded by enclosure 106 when mobile device 104 is being used in the head-mounted configuration.

Figure 2:
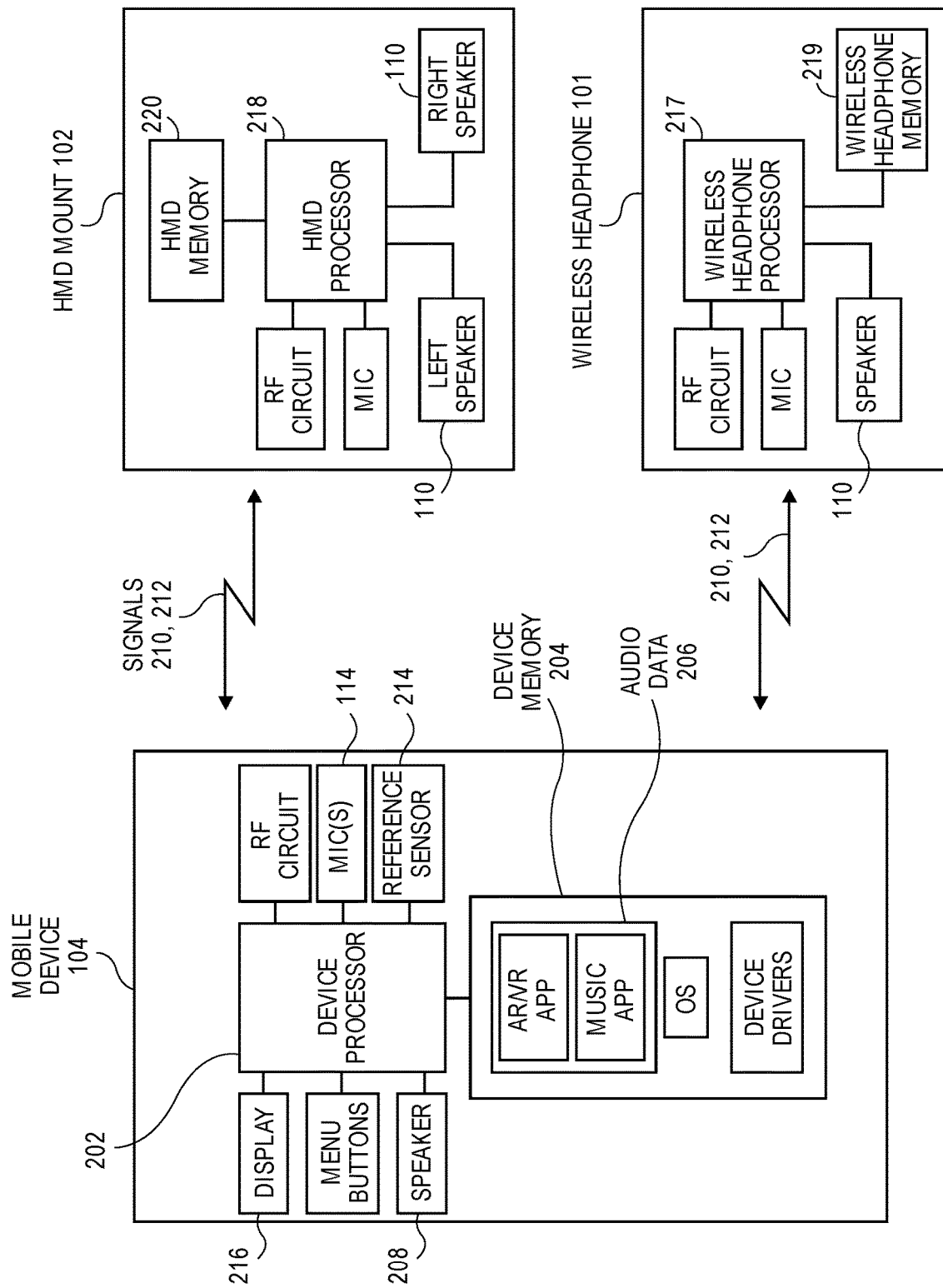
FIG. 2 is a block diagram of a system, in accordance with an embodiment.

Referring to FIG. 2, a block diagram of a system is shown in accordance with an embodiment. Mobile device 104 may be any of several types of portable devices or apparatuses with circuitry suited to specific functionality. Accordingly, the diagrammed circuitry is provided by way of example and not limitation. Mobile device 104 may include one or more device processors 202 to execute instructions to carry out the different functions and capabilities described below. Instructions executed by device processor(s) 202 of mobile device 104 may be retrieved from a device memory 204, which may include a non-transitory machine-readable medium. The instructions may be in the form of an operating system program having device drivers and/or an audio rendering engine for rendering a virtual sound source according to the methods described below. Device processor(s) 202 may also retrieve audio data 206 from device memory 204, including audio data associated with phone and/or music playback functions controlled by the telephony or music application programs that run on top of the operating system. Similarly, audio data 206 may be associated with an augmented reality or virtual reality application program that runs on top of the operating system. To perform such functions, device processor(s) 202 may directly or indirectly implement control loops and receive input signals from and/or provide output signals to other electronic components. For example, mobile device 104 may receive input signals from microphone(s) 114, menu buttons, or reference sensor 214. Mobile device 104 can output an audio signal 210. Audio signal 210 can contain audio data 206. Mobile device 104 can generate and output audio signal 210 to a device speaker 208 and/or to wireless headphone 101 (or HMD mount 102) via a wired or wireless communication link. For example, the communication link can be established by a wireless connection using a Bluetooth standard, and device processor 202 can transmit audio signal 210 wirelessly to wireless headphone processor 217 (or HMD processor 218) via the communication link. Wireless headphone 101 or HMD mount 102 may receive and process the audio signal 210 to render sound 112, as described below. More particularly, wireless headphone 101 or HMD mount 102 can receive and playback audio signal 210 to render sound 112 from the headphone speaker(s) 110.

Mobile device 104 can communicate various signals. For example, in addition to audio signal 210, device processor 202 can generate an audio mode signal 212. Audio mode signal 212 can be generated and or transmitted when mobile device 104 is mounted in HMD mount 102. Device processor 202 can transmit audio mode signal 212 to wireless headphone processor 217 of wireless headphone 101 or to HMD processor 218 of HMD mount 102. Audio mode signal 212 can contain a bit field to indicate to the receiving component, e.g., wireless headphone 101 or HMD mount 102, that mobile device 104 and HMD mount 102 are physically paired.

In an embodiment, the electronic circuitry of mobile device 104 includes a reference sensor 214 to output reference orientation data corresponding to a reference direction of mobile device 104. The reference orientation data may be served to device processor 202 or device memory 204, and device processor(s) 202 may retrieve the reference orientation data from device memory 204. Reference sensor 214 may be one or more of any known orientation sensor, such as accelerometers, magnetometers, gyroscopes, etc. For example, reference sensor 214 may be an inertial measurement unit (IMU) integrated within a housing of mobile device 104. Such inertial-based examples are not restrictive, however, and reference sensor 214 may include non-inertial sensors, such as optical sensors. The reference orientation data generated by reference sensor 214 can be used as an input to control an image presented on a display 216 of mobile device 104. For example, when mobile device 104 is mounted on HMD mount 102, movement of the user's head in a rightward direction may generate reference orientation data to cause device processor 202 to render an image of a person presented on display 216 in a leftward direction. A portion of audio signal 210 corresponding to the image, e.g., a voice of the person, may be adjusted by device processor 202 to spatialize sound 112 being rendered to the user as also moving leftward.

Circuitry in the mounting body of HMD mount 102 and/or a headphone housing of wireless headphone 101 may receive audio signal 210 from mobile device 104. Wireless headphone 101 can include a wireless headphone processor 217 to receive and process audio signal 210 transmitted from device processor 202. Similarly, when the audio hardware of system 100 is incorporated into HMD mount 102, the mounting body can contain an HMD processor 218 to receive and process audio signal 210 transmitted from device processor 202, or other components of mobile device 104. Wireless headphone processor 217 can store audio signal 210 in a wireless headphone memory 219, and HMD processor 218 can store audio signal 210 in an HMD memory 220. Audio signal 210 can be retrieved from the memory by the respective processor for playback by speakers 110 of the respective headphone component. Wireless headphone memory 219 or HMD memory 220 can include a non-transitory machine-readable medium having a buffer, e.g., an audio jitter buffer, to store data contained in audio signal 210 for playback. More particularly, wireless headphone processor 217 may be configured to present an audio output to the user via speaker 110, and HMD processor 218 may be configured to present an audio output to the user via left speaker 110 and right speaker 110. System 100 may include several wireless headphone 101 components, such that a first wireless headphone can be configured to present a left channel audio output and a second wireless headphone can be configured to present a right channel audio output. The respective processor, (wireless headphone processor 217 or HMD processor 218) may provide audio electrical signals corresponding to the buffered audio data to speakers 110 such that stereo sound 112 from speakers 110 renders a virtual sound source in a source direction. For example, sound 112 may be rendered to correspond to movement of an object in a virtual reality scene playing on display 216 of mobile device 104.

The processor(s) of wireless headphone 101 and/or HMD mount 102 may be connected to a respective RF circuit to receive and process audio signal 210. Furthermore, the RF circuits of HMD mount 102 and wireless headphone 101 may be in signal communication. Accordingly, functionality of HMD mount 102 and wireless headphone 101 may be distributed. For example, signals can be wirelessly relayed by HMD mount 102 to wireless headphone 101 from mobile device 104. Accordingly, mobile device 104 may separately communicate audio signal 210 to HMD mount processor 218 for processing or buffering, and HMD processor 218 can relay the processed signal to wireless headphone processor 217 for output by speaker 110 of wireless headphone 101. Accordingly, the audio hardware of system 100 can be incorporated in one or both of wireless headphone 101 and HMD mount 102.

Figure 3:
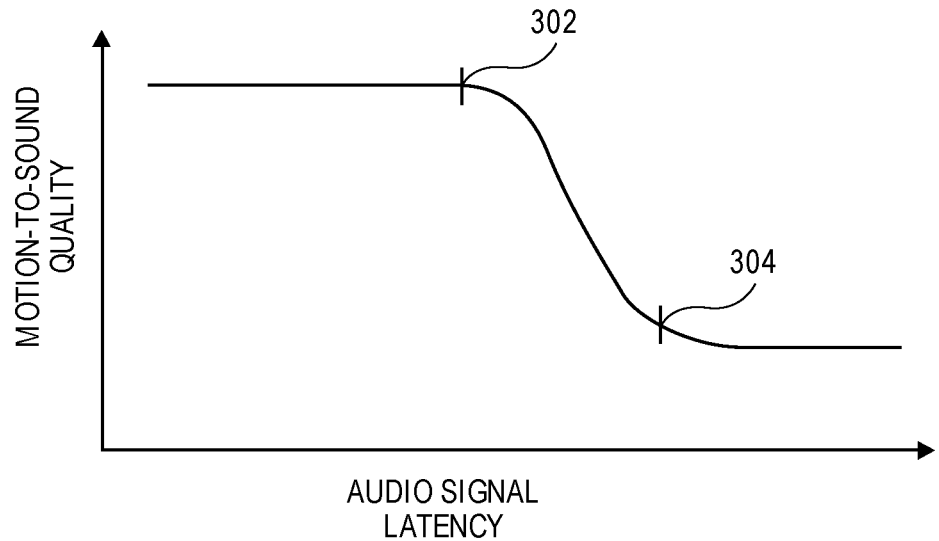
FIG. 3 is a graph of motion-to-sound quality plotted against audio signal latency for a system, in accordance with an embodiment.

Referring to FIG. 3, a graph of motion-to-sound quality plotted against audio signal latency for a system is shown in accordance with an embodiment. Device processor 202 and a receiving processor (wireless headphone processor 217 or HMD processor 218) may execute an audio rendering algorithm to determine the appropriate audio electrical signals for left and right speakers 110 to render a spatialized sound source in an appropriate direction. More particularly, processor(s) of system 100 may operate in an audio mode to deliver a virtual reality or augmented reality experience for the user. When the user's head moves while using the augmented reality or virtual reality application with mobile device 104 mounted on HMD mount 102, the rendered sound image should track with the video image presented on display 216.

To achieve the desired tracking between the sound image and the video image, which may be referred to as motion-to-sound latency, a latency of the audio signal 210 must be within a predetermined range. More particularly, when audio signal latency is less than a predetermined minimum threshold 302, the motion-to-sound quality is good and the sound image is perceived as tracking to the video image. By contrast, when audio signal latency is more than a predetermined maximum threshold 304, motion-to-sound quality is not good and the sound image is perceived as being disjointed from the video image. For augmented reality and virtual reality applications, predetermined minimum threshold 302 can be 50 milliseconds, and predetermined maximum threshold 304 can be 150 milliseconds. Accordingly, in an embodiment, to achieve the desired tracking between the sound image and the video image, audio signal latency is less than 150 milliseconds, and more preferably less than 50 milliseconds. Existing modes of wireless media playback, however, have audio signal latency greater than 200 milliseconds. Accordingly, generation and playback of audio signal 210 using existing modes of wireless media playback may not provide a realistic augmented reality or virtual reality experience to the user. To achieve the desired motion-to-sound latency, system 100 can process audio signal 210 differently than existing modes of wireless media playback when mobile device 104 is mounted on HMD mount 102.

Figure 4:
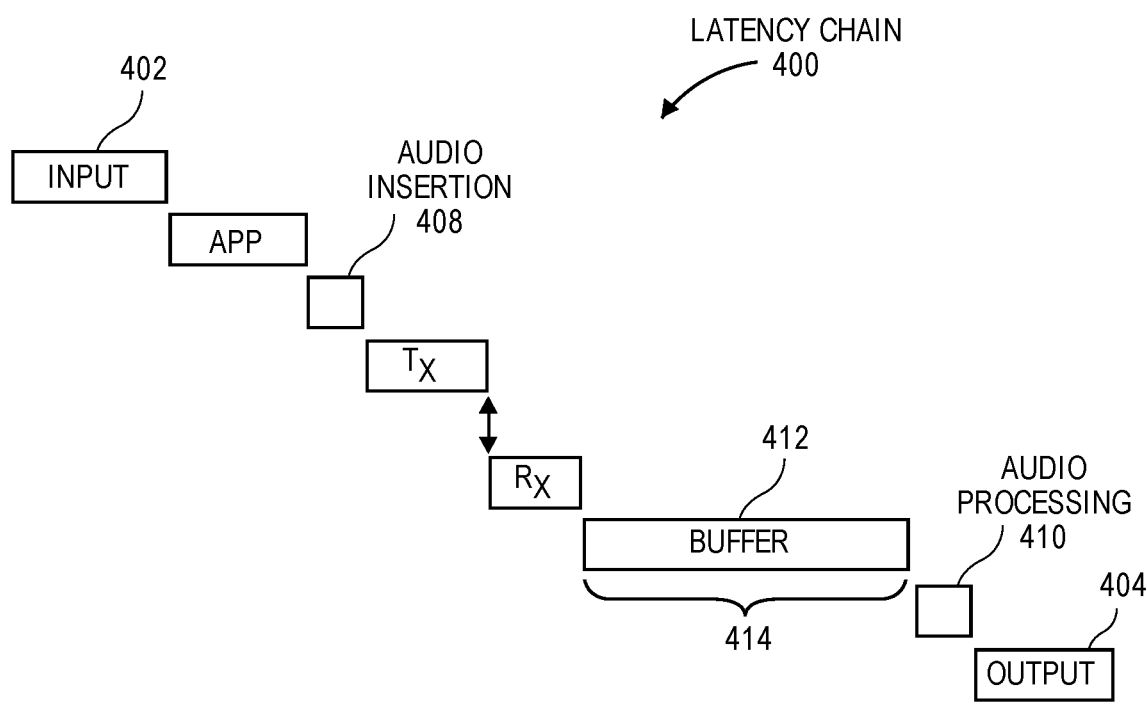
FIG. 4 is a pictorial view of a latency chain of a system, in accordance with an embodiment.

Referring to FIG. 4, a pictorial view of a latency chain of a system is shown in accordance with an embodiment. A latency chain 400 represents the audio signal latency as a period of delay between a motion input 402 entering system 100 and an audio output 404 exiting system 100. Motion input 402 may be a movement of the user's head while the user is wearing system 100 and viewing an augmented reality scene. Audio output 404 may render sound 112 corresponding to motion input 402, e.g., audio output 404 may be a moving sound image corresponding to a person displayed in the augmented reality scene. Accordingly, the entire latency chain 400 corresponds to the motion-to-sound latency of system 100.

Audio signal latency may be a portion of latency chain 400. Audio signal latency can include the period of delay between audio insertion 408 made by device processor 202 and audio processing 410 made by the receiving processor (wireless headphone processor 217 or HMD processor 218). More particularly, audio signal latency can represent latency between mobile device 104 and a headphone component (either external or built into of HMD mount 102). Audio insertion 408 may result from motion input 402. For example, the head movement may cause reference sensor 214 to generate reference orientation data as a motion input 402 that is processed by the augmented reality application to cause a movement of the displayed scene and an adjustment to the audio signal 210. The audio signal adjustment represented by audio insertion 408. Audio signal 210 can be transmitted over the air from a transmitter of mobile device 104 to a receiver of wireless headphone 101 or HMD mount 102. The receiver can be a portion of the wireless headphone component, and thus, latency optimization described herein can be between mobile device 104 and a wireless headphone connected to mobile device 104. Wireless headphone 101 or HMD mount 102 can receive audio signal 210 and store audio signal 210 in a respective buffer 412 (of wireless headphone memory 219 or HMD memory 220). Storage of audio signal 210 in buffer 412 can provide signal reliability by allowing timing corrections to be made on a data stream of audio signal 210. Buffer 412 may account for a majority of latency chain 400 under existing modes of wireless media playback. For example, buffer 412 may have a size 414, e.g., a length, of more than 200 milliseconds in a first (e.g., a normal) audio mode used for music playback. The buffered audio signal 210 can then be locally processed by wireless headphone processor 217 or HMD processor 218, e.g., to perform equalization, and then output to speakers 110 for playback as audio output 404. As described below, processes along the audio signal latency portion of latency chain 400 may be reduced when mobile device 104 is mounted on HMD mount 102 to reduce audio signal latency below predetermined minimum threshold 302 and achieve the desired motion-to-sound quality.

Figure 5:
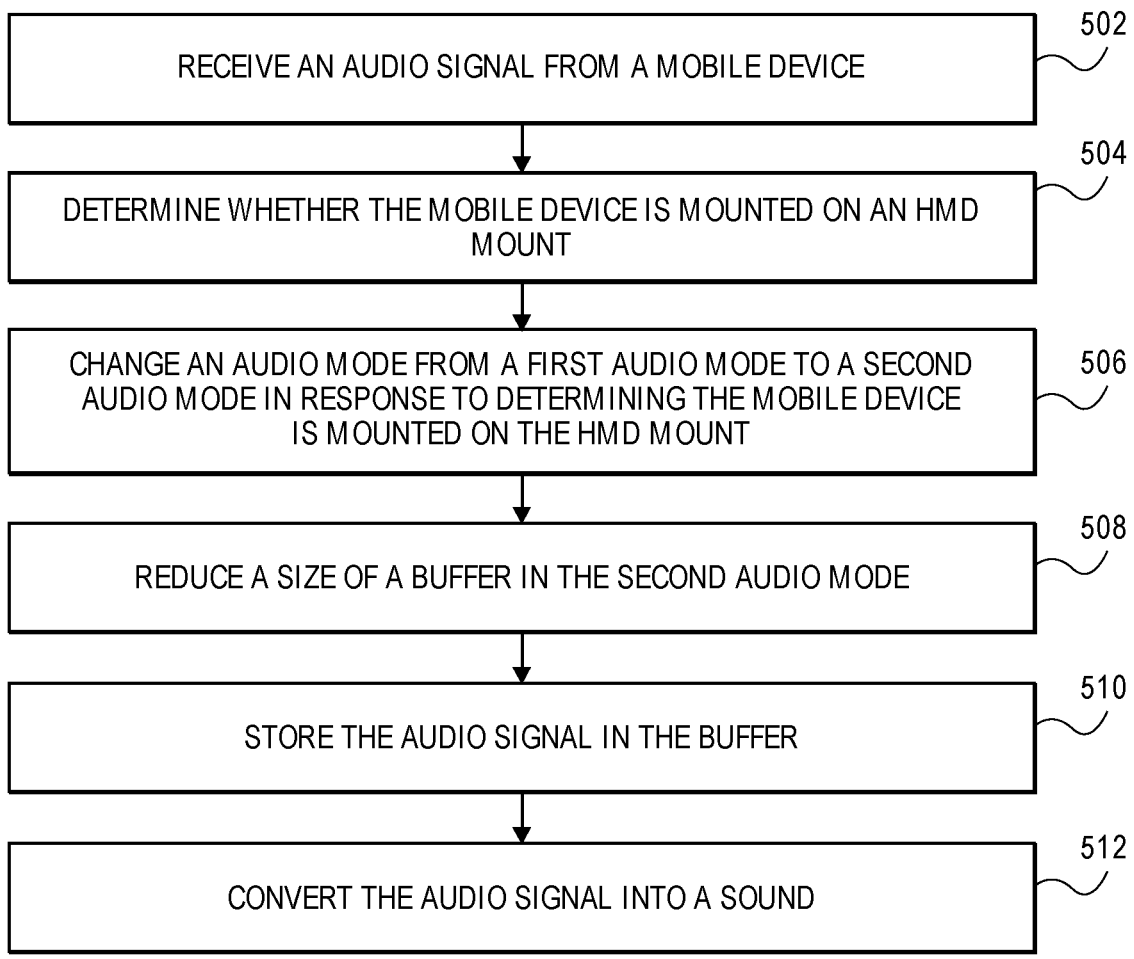
FIG. 5 is a flowchart of a method of adjusting a latency parameter of a system in a second audio mode, in accordance with an embodiment.

Referring to FIG. 5, a flowchart of a method of adjusting a latency parameter of a system in a second audio mode is shown in accordance with an embodiment. At operation 502, wireless headphone 101 or HMD mount 102 receives audio signal 210 from mobile device 104. Audio signal 210 can be generated by device processor 202 at audio insertion 408 of latency chain 400 and transmitted wirelessly over the air from a transceiver of mobile device 104 to a transceiver of the wireless headphone 101 or HMD mount 102. The transmission can be directly to wireless headphone 101 or via HMD mount 102. In an embodiment, device processor 202 and/or the receiving processor are configured to process audio signal 210 in a first audio mode. For example, the first audio mode may be an audio mode used by system 100 when mobile device 104 is not mounted on HMD mount 102. The first audio mode can be used during playback of music by the wireless headphone component (external to or built into HMD mount 102) when mobile device 104 is in a hand-held configuration, e.g., when mobile device 104 is running the music application. In the first audio mode, size 414 of buffer 412 may be more than 200 milliseconds.

At operation 504, system 100 determines whether mobile device 104 is mounted on HMD mount 102. The determination can be made by device processor 202 and/or the receiving processor. For example, mobile device 104 and/or HMD mount 102 can include a proximity sensor (not shown in FIG. 2) to determine whether mobile device 104 is loaded into a cavity of enclosure 106. When the proximity sensor detects an adjacency of mobile device 104 and HMD mount 102, the sensor can transmit a corresponding signal to the respective processor.

The adjacency between mobile device 104 and HMD mount 102 can be detected in other manners. By way of example, mobile device 104 and HMD mount 102 may communicate by near field communication. When mobile device 104 is mounted on HMD mount 102, the components may initiate communication. HMD mount 102 can authenticate mobile device 104 as being a specific type of device, e.g., mobile phone. Similarly, mobile device 104 can authenticate HMD mount 102 as being a specific type of device, e.g., an augmented reality or virtual reality headset. In either case, device processor 202 and/or the receiving processor can detect that mobile device 104 is mounted on HMD mount 102.

When mobile device 104 is mounted on HMD mount 102, device processor 202 can generate audio mode signal 212. More particularly, device processor 202 can generate audio mode signal 212 in response to detecting the adjacency between mobile device 104 and HMD mount 102. Wireless headphone 217 or HMD processor 218 can receive audio mode signal 212. In an embodiment, the receiving processor is configured to determine mobile device 104 is mounted on HMD mount 102 in response to receiving audio mode signal 212. Accordingly, device processor 202 or HMD processor 218 can determine that mobile device 104 is mounted on HMD mount 102, and the receiving processor may make the determination based on a received signal indicating the physical relationship.

At operation 506, system 100 can change the audio mode from the first audio mode to a second (e.g., a special) audio mode in response to determining that mobile device 104 is mounted on HMD mount 102. Device processor 202 and/or the receiving processor is configured to process audio signal 210 differently in the second audio mode than in the first audio mode. The difference in signal processing may have any of several effects as described in more detail below. For example, the second audio mode may entail changing a latency parameter or a non-latency parameter of system 100. Accordingly, the audio parameters may be different in the second audio mode as compared to the first audio mode.

The change from the first audio mode to the second audio mode is activated in response to device mounting. Accordingly, the second audio mode is a device-mount audio mode. The device-mount audio mode makes system 100 an active system, as compared to a passive system that requires a user input to change or control audio output. That is, the headset system can change the audio mode automatically by detecting that mobile device 104 is in HMD mount 102, without requiring the user to manually enter an audio parameter into the augmented reality or virtual reality application.

At operation 508, wireless headphone processor 217 or HMD processor 218 processes audio signal 210 differently at least in part by reducing size 414 of buffer 412 in the second audio mode. Audio signal 210 may be communicated from mobile device 104 to wireless headphone 101 or HMD mount 102 through a digital wireless interface, e.g., a Bluetooth adapter, using a Bluetooth standard. Accordingly, buffer 412 can be an audio jitter buffer 412. Size 414 of the audio jitter buffer 412 in the second audio mode may be less than half of size 414 in the first audio mode. For example, whereas size 414 in the first audio mode may be more than 200 milliseconds, size 414 in the second audio mode may be less than 50 milliseconds. In an embodiment, size 414 of the audio jitter buffer 412 in the second audio mode is less than 40 milliseconds.

At operation 510, audio signal 210 is stored in buffer 412. Audio signal 210 may be stored by wireless headphone 219 or HMD memory 220. For example, wireless headphone processor 217 may, upon receiving audio signal 210 from mobile device 104, write audio data contained in audio signal 210 into buffer 412 in wireless headphone memory 219. Storing audio data in a smaller audio jitter buffer 412 is part of the lower latency wireless mode (the second audio mode). High latency buffering is not required to maintain reliability in the lower latency wireless mode in part because the antennas of mobile device 104 and wireless headphone 101 or HMD mount 102 are close enough to each other, e.g., within a few inches and in line of sight, to reduce the likelihood of data loss or timing errors during data transfer.

At operation 512, audio signal 210 is converted into sound 112. One or more speakers can convert audio signal 210 into sound 112. For example, speakers 110 can render sound 112 in a standard stereo experience, or in a virtual sound experience as described below. The rendered sound 112 may track well to movement of images displayed on mobile device 104 as a result of the lower latency wireless mode entered into when mobile device 104 is placed in enclosure 106.

When mobile device 104 is mounted, e.g., placed in enclosure 106 of HMD mount 102, system 100 may adapt to a new mode of operation in several other ways. More particularly, transition of the audio mode from the first audio mode to the second audio mode may include other operations. In an embodiment, when it is determined that mobile device 104 is mounted on HMD mount 102, any current audio playback by speakers 110 may fade out. For example, the user may be listening to music played by speakers 110, and insertion of mobile device 104 into HMD mount 102 may cue system 100 that the user is transitioning from a music listening mode having a standard stereo experience to an augmented reality mode having a spatialized sound experience. System use cases can include virtual reality and augmented reality games, media playback, telephonic communications, and interactions with an intelligent personal assistant of the operating system stored on mobile device 104. System 100 may transition between different audio experiences for each of these use cases based on whether mobile device 104 is mounted on HMD mount 102.

As described above, the lower latency wireless mode can include a reduction of buffer size 414 when system 100 enters the second audio mode. The lower latency wireless mode can include changing one or more other latency parameters of the wireless data exchange stack used to transfer the audio signal 210 from mobile device 104 to wireless headphone 101 or HMD mount 102. In an embodiment, device processor 202 is configured to change an audio encoding format of audio signal 210. Device processor 202 can change the audio encoding format in response to determining that mobile device 104 is mounted on HMD mount 102. More particularly, when mobile device 104 is mounted on HMD mount 102, the audio encoding format of audio signal 210 can be changed from a first audio encoding format to a second audio encoding format having lower latency than the first audio encoding format. By way of example, system 100 may use a digital audio encoder and decoder to transfer audio signal 210 from mobile device 104 to wireless headphone 101 or HMD mount 102. In the first audio mode, the digital audio codec may be an advanced audio coding codec having a low-complexity profile (AAC-LC). In the second audio mode, the digital audio codec may be changed to a codec having lower latency between encode and decode operations, e.g., a low-complexity subband codec (SBC). In an embodiment, system 100 may have no digital audio compression in the second audio mode. For example, audio signal 210 may be transmitted from mobile device 104 to wireless headphone 101 or HMD mount 102 as uncompressed audio.

Other changes of latency parameters in the second audio mode may include a change to a transmit buffer on the transmit side. Device memory 204 may include a transmit buffer which defines in part how often device processor 202 provides data to the wireless data exchange stack, e.g., Bluetooth stack. In an embodiment, the transmit buffer may be reduced in the second audio mode as compared to the first audio mode. For example, the transmit buffer may be 10 milliseconds in the first audio mode, and may be reduced to less than 10 milliseconds in the second audio mode.

Latency chain 400 may be adapted to the second audio mode by changing an audio I/O cycle time. For example, when mobile device 104 is determined to be mounted on HMD mount 102, an amplifier of the output speakers of system 100 (controlled by wireless headphone processor 217 or HMD processor 218) can request audio data from an audio application stored on a respective memory at a different rate. For example, rather than requesting audio data each time a first predetermined number of samples has been read from wireless headphone memory 219, wireless headphone processor 217 can request audio data 206 each time a second predetermined number of samples less than the first predetermined number of samples has been read from wireless headphone memory 219. By way of example, wireless headphone processor 217 can request audio data each time 1024 samples is read in the first audio mode, and may request audio data each time 64 samples is read in the second audio mode.

The change to the audio mode of system 100 can include changes to non-latency parameters. For example, when system 100 enters the second audio mode, a virtual sound direction of sound sources associated with an augmented reality or virtual reality scene may be adjusted. This example of a non-latency adjustment is described below by way of example and not limitation.

Figure 6:
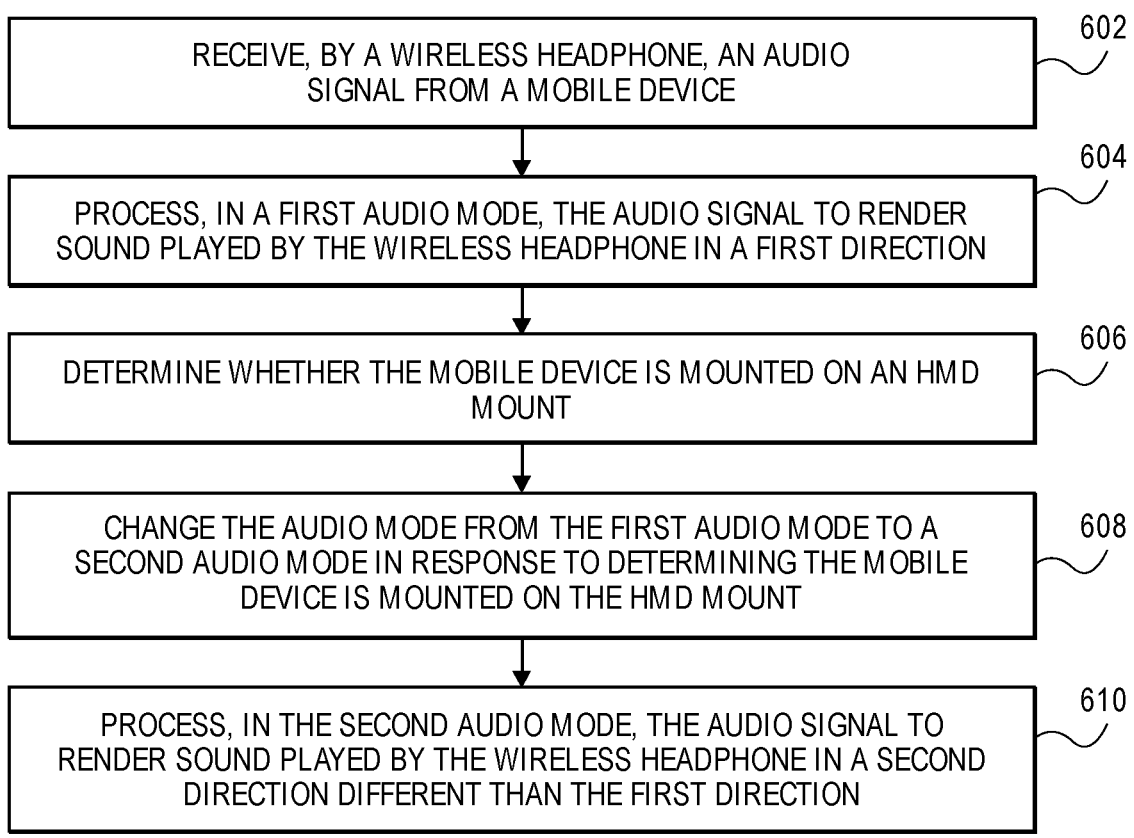
FIG. 6 is a flowchart of a method of adjusting a non-latency parameter of a system in a second audio mode, in accordance with an embodiment.
Figure 7A:
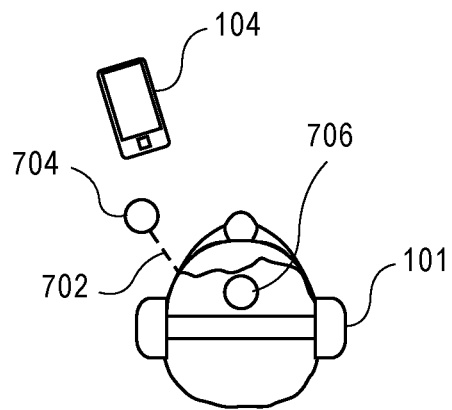
FIGS. 7A-7B are pictorial views of a method of adjusting sound rendering by a wireless headphone in a second audio mode, in accordance with an embodiment.
Figure 7B:
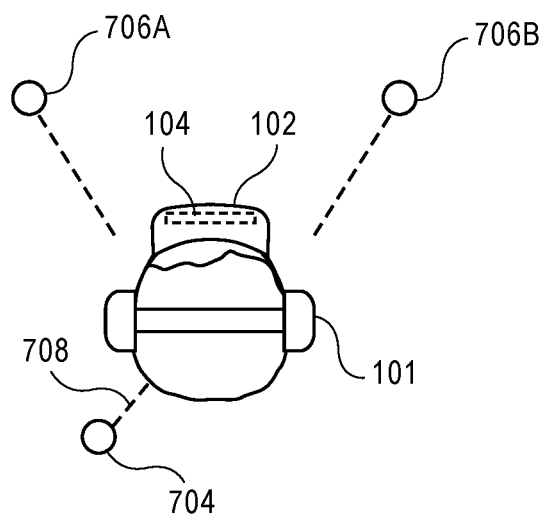

Referring to FIG. 6, a flowchart of a method of adjusting non-latency parameters of a system in a second audio mode is shown in accordance with an embodiment. FIGS. 7A-7B are pictorial views of the method of FIG. 6, and thus, the related figures are alternately referenced in the following description. It is noted that the description applies to system 100 having wireless headphone 101 as the sound reproduction unit, but the description similarly applies to an embodiment including built-in headphones of HMD mount 102 operating as the sound reproduction unit.

At operation 602, wireless headphone 101 receives audio signal 210 from mobile device 104. Audio signal 210 may be streamed from mobile device 104 to wireless headphone 101 in the first audio mode. At operation 604, in the first audio mode, audio signal 210 is processed to render sound 112 played by wireless headphone 101. Referring to FIG. 7A, various sounds may be played back by wireless headphone 101. HMD mount 102 can play the sounds in a spatialized audio experience that renders virtual sounds in different directions. For example, speakers 110 may play sounds associated with an intelligent personal assistant in a first direction 702. First direction 702 may be in a direction of mobile device 104. In the first audio mode, mobile device 104 may be in a hand-held configuration, and thus, playing the intelligent personal assistant voice 704 in first direction 702 toward mobile device 104 can cause the user to experience the voice as coming from mobile device 104. Other sounds, such as sound from a music source 706, can be rendered in other directions. For example, in the first audio mode, sound from music source 706 may be spatialized as a sound imaged centered inside of the user's head.

At operation 606, system 100 can determine whether mobile device 104 is mounted on HMD mount 102. At operation 608, in response to determining mobile device 104 is mounted on HMD mount 102, the audio mode of system 100 can be changed from the first audio mode to the second audio mode. At operation 610, audio signal 210 can be processed in the second audio mode to render the sounds in different directions than in the first audio mode. For example, rather than rendering sound associated with intelligent personal assistant voice 704 in first direction 702, the voice 704 can be rendered in a second direction 708 having a predetermined physical relationship to the user. By way of example, second direction 708 may be behind and/or above the user. Intelligent personal assistant voice 704 can be spatialized in second direction 708, which may be away from mobile device 104 mounted on user's head. Similarly, the sound associated with music playback may be spatialized to a different location in the second audio mode than in the first audio mode. For example, music source 706 may be rendered as coming from in front of the user. Music source 706 can be split into different sources 706A, 706B representing, for example, different sections of an orchestra. Accordingly, the change in the audio mode that occurs automatically when mobile device 104 is mounted on HMD mount 102 can affect music playback parameters, e.g., playback volume or sound source directions, without necessarily changing parameters of latency chain 400.

Figure 8A:
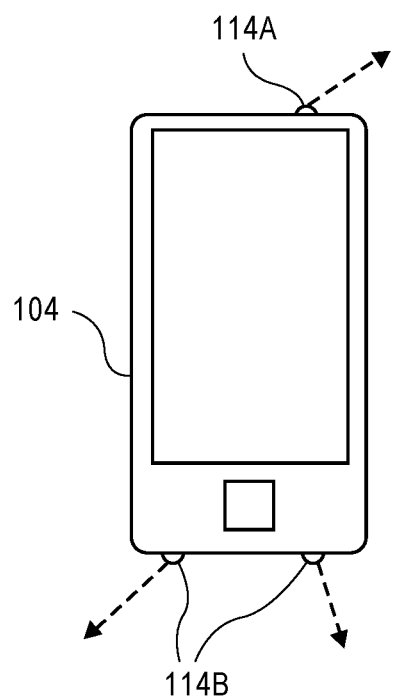
FIGS. 8A-8B are pictorial views of a method of adjusting microphone focusing by a mobile device in a second audio mode, in accordance with an embodiment.

Another non-latency adjustment may be to microphone parameters of system 100. For example, when system 100 enters the second audio mode, a focus direction of a microphone pick up may be adjusted. Referring to FIG. 8A, a pictorial view of a method of adjusting microphone focusing by a mobile device 104 in a second audio mode is shown in accordance with an embodiment. The audio mode of system 100 can include an audio pickup focusing parameter used to focus a pickup direction of microphones 114 integrated in mobile device 104 (or wireless headphone 101 or HMD mount 102). By way of example, microphones 114 of mobile device 104 can be controlled to pick up speech in a particular direction. When mobile device 104 is in the hand-held configuration, the audio focusing parameter may be set to cause microphones 114A and 114B to receive sound from a surrounding environment. The directionality of the microphones 114 can be generally outward from a housing of mobile device 104, e.g., may not be focused toward a particular location.

Figure 8B:
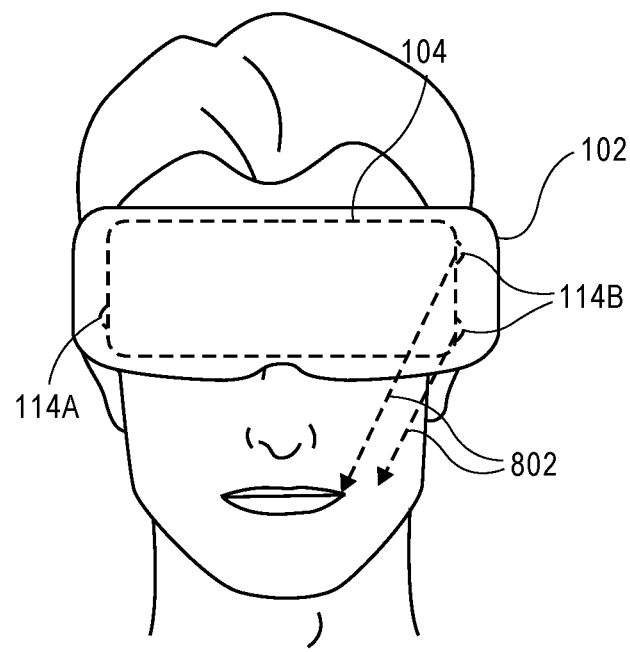

Referring to FIG. 8B, device processor 202 may be configured to adjust the audio pickup focusing parameter to focus microphones 114 of mobile device 104 in a preset direction 802 when mobile device 104 is mounted on HMD mount 102. For example, the audio pickup focusing parameter can pick up speech based on where a mouth of the user is expected to be when mobile device 104 is mounted on HMD mount 102. The preset direction 802 of microphone pick up can be toward the mouth.

In an embodiment, microphone adjustments can include disabling certain microphones and/or prioritizing pickup of some microphones over others. HMD mount 102 may occlude microphone 114A when mobile device 104 is mounted on HMD mount 102, and microphones 114B may not be occluded in the mounted configuration. Accordingly, microphone pick up of microphone 114A may be disabled when mobile device 104 is mounted on HMD mount 102. By contrast, microphone pick up of microphones 114B may remain enabled and may be directed to pick up the voice of the user. Accordingly, the change in the audio mode that occurs automatically when mobile device 104 is mounted on HMD mount 102 can affect hardware parameters of mobile device 104 (or wireless headphone 101 or HMD mount 102) without necessarily changing parameters of the wireless data exchange stack.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system, comprising a mobile device including a device processor, the system configured to:
   detect an adjacency between the mobile device and a head-mounted display (HMD) mount;
   transmit an audio signal from the device processor to a wireless headphone; and
   change an audio mode of one or more of the mobile device or the wireless headphone from a first audio mode to a second audio mode in response to detecting the adjacency between the mobile device and the HMD mount, wherein the device processor or a wireless headphone processor of the wireless headphone is configured to process the audio signal differently in the second audio mode than in the first audio mode.

2. The system of claim 1, wherein the wireless headphone includes a wireless headphone memory having a buffer to store the audio signal, and wherein the wireless headphone processor reduces a size of the buffer in the second audio mode.

3. The system of claim 2, wherein the buffer is an audio jitter buffer, and wherein the size of the audio jitter buffer in the second audio mode is less than half of the size in the first audio mode.

4. The system of claim 3, wherein the size of the audio jitter buffer in the second audio mode is less than 40 milliseconds.

5. The system of claim 1, wherein the device processor generates an audio mode signal in response to detecting the adjacency between the mobile device and the HMD mount, and wherein the wireless headphone processor is configured to determine the mobile device is mounted on the HMD mount in response to receiving the audio mode signal from the mobile device.

6. The system of claim 5, wherein the device processor is configured to change an audio encoding format of the audio signal from a first audio encoding format to a second audio encoding format having lower latency than the first audio encoding format when the mobile device is mounted on the HMD mount.

7. The system of claim 5, wherein the mobile device includes a plurality of microphones, and wherein the device processor is configured to adjust an audio pickup focusing parameter to focus the plurality of microphones in a preset direction when the mobile device is mounted on the HMD mount.

8. The system of claim 1, wherein the wireless headphone includes a plurality of speakers to convert the audio signal into a sound, wherein the audio signal is processed in the first audio mode to render the sound in a first direction, and wherein the audio signal is processed in the second audio mode to render the sound in a second direction different than the first direction.

9. A method, comprising:
  detecting by a device processor of a mobile device, an adjacency between the mobile device and an HMD mount;
  receiving, by the wireless headphone processor of a wireless headphone, an audio signal from the device processor of the mobile device; and
  changing, by one or more of the wireless headphone processor or the device processor, an audio mode of the wireless headphone or the mobile device from a first audio mode to a second audio mode in response to detecting the adjacency between the mobile device and the HMD mount, wherein the one or more of the wireless headphone processor or the device processor is configured to process the audio signal differently in the second audio mode than in the first audio mode.

10. The method of claim 9 further comprising:
  reducing, by the wireless headphone processor, a size of a buffer in a wireless headphone memory of the wireless headphone in the second audio mode; and
  storing, by the wireless headphone memory, the audio signal in the buffer.

11. The method of claim 10, wherein the buffer is an audio jitter buffer, and wherein the size of the audio jitter buffer in the second audio mode is less than half of the size in the first audio mode.

12. The method of claim 11, wherein the size of the audio jitter buffer in the second audio mode is less than 40 milliseconds.

13. The method of claim 9 further comprising:
  generating, by the device processor of the mobile device in response to detecting the adjacency between the mobile device and the HMD mount, an audio mode signal; and
  receiving, by the wireless headphone processor, the audio mode signal, wherein the wireless headphone processor is configured to determine the mobile device is mounted on the HMD mount in response to receiving the audio mode signal.

14. The method of claim 9 further comprising:
  converting, by a plurality of speakers of the wireless headphone, the audio signal into a sound;
  processing, in the first audio mode, the audio signal to render the sound in a first direction; and
  processing, in the second audio mode, the audio signal to render the sound in a second direction different than the first direction.

15. A non-transitory machine readable medium storing instructions, which when executed by one or more processors of a system, causes the system to perform a method comprising:
  detecting an adjacency between a mobile device and a head-mounted display (HMD) mount;
  transmitting an audio signal from the mobile device to a wireless headphone; and
  changing an audio mode of one or more of the mobile device or the wireless headphone from a first audio mode to a second audio mode in response to detecting the adjacency between the mobile device and the HMD mount, wherein one or more of a device processor of the mobile device or a wireless headphone processor of the wireless headphone is configured to process the audio signal differently in the second audio mode than in the first audio mode.

16. The non-transitory machine readable medium of claim 15, the method further comprising:
  reducing, in the second audio mode, a size of a buffer in a wireless headphone memory of the wireless headphone; and
  storing the audio signal in the buffer.

17. The non-transitory machine readable medium of claim 16, wherein the buffer is an audio jitter buffer, and wherein the size of the audio jitter buffer in the second audio mode is less than half of the size in the first audio mode.

18. The non-transitory machine readable medium of claim 17, wherein the size of the audio jitter buffer in the second audio mode is less than 40 milliseconds.

19. The non-transitory machine readable medium of claim 15, the method further comprising:
  generating, by the device processor of the mobile device in response to detecting the adjacency between the mobile device and the HMD mount, an audio mode signal; and
  receiving, by the wireless headphone processor, the audio mode signal, wherein the wireless headphone processor is configured to determine the mobile device is mounted on the HMD mount in response to receiving the audio mode signal.

20. The non-transitory machine readable medium of claim 15, the method further comprising:
  converting, by a plurality of speakers of the wireless headphone, the audio signal into a sound;

processing, in the first audio mode, the audio signal to render sound in a first direction; and processing, in the second audio mode, the audio signal to render the sound in a second direction different than the first direction.

* * * * *